Patented July 13, 1948

2,445,306

UNITED STATES PATENT OFFICE 2,445,306

ELECTROLYTE FOR PRIMARY CELLS COMPRISING LITHIUM BROMIDE

Herbert E. Lawson, Chevy Chase, Md., assignor to the United States of America as represented by the Secretary of the Navy No Drawing. Application October 6, 1943, Serial No. 505,225

4 Claims. (Cl. 136—155)

This invention relates to conducting solutions for activating electric batteries and has particular relation to contact electrolyte solutions for use in deferred action type batteries for electrically operated projectiles.

Electrolytes for use in deferred action type batteries employed for supplying operating voltages for projectiles must be capable of functioning at the extreme and rapidly varying temperatures to which projectiles are often subjected. The electrical assemblies of these projectiles must be operable at all climatic temperatures present on the surface of the earth and at high altitudes. Thus there exists a distinct need for an electrolyte solution which is operative at extremely low and high climatic temperatures, and which has a minimum difference in voltage output at low and high temperatures, and a wide critical temperature range.

An object of the present invention is to provide an electrolyte solution for use in deferred action type batteries which will operate efficiently at extremely low and high temperatures.

Another object of the invention is to provide an electrolyte solution which will maintain a minimum difference in voltage output at extremely low and high temperatures.

A still further object of the invention is to provide an electrolyte solution of a sufficiently low viscosity so that uniform activation within a minimum period of time will be assured.

These and other objects of the invention will be understood by reference to the following description.

The contact electrolyte solution of my invention is adapted for use in primary wet cell, deferred action type batteries having one electrode of magnesium and the other of silver. Specifically, the anode of the battery with which the present electrolyte is used is formed of magnesium, and the cathode employed is formed of silver. A depolarizer composed of silver bromide and silver chloride is deposited on the silver cathode. Batteries of this type are disclosed in my copending application for Letters Patent, Serial No. 424,419; filed December 26, 1941, now Patent No. 2,428,850, dated October 14, 1947.

I have found that the presence of an alkaline metal or alkaline earth metal bromide in an acidified electrolyte solution will produce a useable cell provided that the metal in solution is not replaced by the metallic anode and provided further that the salt is sufficiently soluble to prevent freezing of the solution at the low temperatures to which batteries for use in electrically operated projectiles are often subjected.

Although it would be expected that all alkaline metal or alkaline earth metal halides would form satisfactory electrolyte solutions, I have found that fluorides are unsatisfactory for the reason that they form an insoluble compound with the metal anode. Thus in the type of battery with which I prefer to employ my electrolyte solution, an insoluble magnesium compound would be formed. I have further found that alkaline metal or alkaline earth metal iodides are unsatisfactory because they attack the silver cathode.

I have further discovered that although alkaline metal or alkaline earth metal bromides lower the voltage output which the cell will deliver at high temperatures and light loads, contrary to all expectations, the voltage output at low temperatures and heavy loads is not lowered nearly so much. I have also discovered that the voltage spread is much less when alkaline metal or alkaline earth metal bromides are employed than when chlorides are used.

The following table is illustrative of the results which I have found will occur with typical percentages of alkaline metal or alkaline earth metal chlorides or bromides in an acidified solution. These solutions were employed in a battery having a magnesium anode and a silver cathode. For purposes of comparison, the electrodes used in the above examples were placed two centimeters apart and were two square centimeters in area. However, electrodes of different dimensions may be used and variations in the spacing of the electrodes may be made.

Each of the salts was dissolved in water and made up in a solution of 100 grams weight having the percentage concentrations indicated below. The salt solutions were acidified with equal molar weights of the halogen acid corresponding to the halide of the salt employed. Approximately 6 grams of a 50% acid solution was used. The concentrations of acid in the final electrolytes were 3% for hydrochloric and 6.7% for hydrobromic. The function of the acid is to lower the pH of the solution and either hydrochloric or hydrobromic acid is satisfactory for this purpose. An electrolyte solution having a hydrogen ion concentration varying from 2 to 7 in terms of pH has been found to be particularly suitable. Sulfuric acid may also be used to acidify the solution, although it causes the formation of sulfates in the solution.

| Electrolyte | Voltage Output | | |
|---|---|---|---|
| | Load of 5 ma. at 130 F. | Load of 15 ma. at 75 F. | Load of 15 ma. at −20 F. |
| 20.0% solution of lithium chloride | 1.80 | 1.75 | 1.45 |
| 43.0% solution of lithium bromide | 1.50 | 1.56 | 1.42 |
| 23.5% solution of magnesium chloride | 1.83 | 1.75 | 1.35 |
| 45.5% solution of magnesium bromide | 1.58 | 1.47 | 1.30 |
| 27.5% solution of calcium chloride | 1.80 | 1.75 | 1.40 |
| 50.0% solution of calcium bromide | 1.40 | 1.52 | 1.25 |

The concentrations of salt may be varied in accordance with the voltage and temperatures desired. A decrease in the concentration of salt raises the freezing point of the solution, produces a higher voltage at high temperatures and a lower voltage at low temperatures, while an increase in the concentration of salt has the opposite effect.

The concentration of acid may be varied or the acid may be omitted in order to alter the activation time of the battery. The use for which batteries of this type are ordinarily employed requires a relatively short activation time varying from a fraction of a second to several seconds. The activation time may be lessened by an increase in the concentration of acid in the electrolyte solution and conversely, a decrease in the concentration of acid results in a lengthened period of activation time. This activation time may be still further lengthened by the complete omission of acid.

The above results reveal that the variation in voltage output is relatively narrow considering the wide temperature ranges to which the batteries were subjected. In particular, the acidified electrolyte solution containing lithium bromide proved to have the least variation in voltage output. A typical electrolyte solution employing lithium bromide consists of 100 grams of a 43% lithium bromide solution dissolved in water with 4 c. c. of 48.5% hydrobromic acid having a specific gravity of 1.49 per 100 c. c. It will be noted that the voltage output of the battery employing lithium bromide varied only slightly while operating at high and low temperatures, the variation in voltage output under the same load being 0.14 volt between the temperatures of 75° F. and −20° F.

I claim:

1. A contact electrolyte solution for use in primary wet cell, deferred action type batteries comprising a lithium bromide, hydrobromic acid and water.

2. A contact electrolyte solution for use in primary wet cell, deferred action type batteries comprising lithium bromide and water.

3. A contact electrolyte solution for use in primary wet cell, deferred action type batteries comprising approximately 41% lithium bromide, 3% hydrobromic acid and 56% water.

4. A contact electrolyte solution for use in primary wet cell, deferred action type batteries having electrodes of magnesium and silver comprising approximately 41% lithium bromide, 3% hydrobromic acid and 56% water.

HERBERT E. LAWSON.

REFERENCES CITED

The following references are of record in the file of this patent:

UNITED STATES PATENTS

| Number | Name | Date |
|---|---|---|
| 383,263 | Whittier | May 22, 1888 |
| 2,078,143 | Jumau | Apr. 20, 1937 |

FOREIGN PATENTS

| Number | Country | Date |
|---|---|---|
| 22,324 | Australia | 1929 |